US012253181B2

(12) United States Patent
Babineaux et al.

(10) Patent No.: US 12,253,181 B2
(45) Date of Patent: Mar. 18, 2025

(54) SYSTEM FOR FLUID TRANSFER

(71) Applicant: CACTUS WELLHEAD, LLC, Houston, TX (US)

(72) Inventors: Chad Babineaux, Lafayette, LA (US); Scott Bender, Houston, TX (US); Steven Bender, Houston, TX (US); Jerod Bushman, Houston, TX (US); Jason Cade, College Station, TX (US); Brenton J. Greska, Katy, TX (US)

(73) Assignee: CACTUS WELLHEAD, LLC, Houston, TX (US)

( * ) Notice: Subject to any disclaimer, the term of this patent is extended or adjusted under 35 U.S.C. 154(b) by 3 days.

(21) Appl. No.: 18/523,479

(22) Filed: Nov. 29, 2023

(65) Prior Publication Data

US 2024/0093793 A1    Mar. 21, 2024

Related U.S. Application Data

(63) Continuation of application No. 16/567,876, filed on Sep. 11, 2019, now abandoned.

(60) Provisional application No. 62/786,080, filed on Dec. 28, 2018.

(51) Int. Cl.

| *F16K 11/22* | (2006.01) |
| *E21B 34/02* | (2006.01) |
| *F16L 37/08* | (2006.01) |
| *E21B 33/038* | (2006.01) |
| *E21B 43/26* | (2006.01) |
| *F16L 23/04* | (2006.01) |

(52) U.S. Cl.
CPC .............. *F16K 11/22* (2013.01); *E21B 34/02* (2013.01); *F16L 37/08* (2013.01); *E21B 33/038* (2013.01); *E21B 43/26* (2013.01); *E21B 43/2607* (2020.05); *F16L 23/04* (2013.01)

(58) Field of Classification Search
CPC .......... F16K 11/22; F16L 37/08; F16L 23/04; E21B 34/02; E21B 43/26; E21B 43/2607; E21B 33/038
USPC ............ 137/15.09; 166/50, 77.51, 97.5, 165, 166/166, 378, 379, 380; 285/33, 290.5, 285/271, 406, 413
See application file for complete search history.

(56) References Cited

U.S. PATENT DOCUMENTS

| 3,976,130 | A | * | 8/1976 | Chambless | ........... B60B 7/0086 |
| | | | | | 166/173 |
| 9,903,190 | B2 | * | 2/2018 | Conrad | .................... E21B 43/26 |
| 10,344,901 | B2 | * | 7/2019 | Penney | .................... F16L 41/03 |
| 11,454,100 | B1 | * | 9/2022 | Choate | ................. E21B 33/068 |
| 2013/0284455 | A1 | * | 10/2013 | Kajaria | .................... E21B 43/26 |
| | | | | | 166/79.1 |
| 2015/0007998 | A1 | * | 1/2015 | Conrad | .................... E21B 43/12 |
| | | | | | 166/308.1 |

(Continued)

*Primary Examiner* — Minh Q Le
(74) *Attorney, Agent, or Firm* — EWING & JONES, PLLC

(57) ABSTRACT

A fluid transfer system includes a valve tree, the valve tree having a master valve having a flow axis and a header. The fluid transfer system further includes a coupler disposed between, connected to, and in fluid communication with, the valve tree and the header. The coupler has a fixed length and includes a coupler multi-path flow connector in fluid communication with the valve tree. The coupler also includes a flow control valve having a flow axis, the flow control valve directly coupled to the coupler multi-path flow connector and in fluid communication with the header.

17 Claims, 7 Drawing Sheets

(56) References Cited

U.S. PATENT DOCUMENTS

| | | | |
|---|---|---|---|
| 2017/0130555 A1* | 5/2017 | Kajaria | E21B 43/2607 |
| 2017/0138144 A1* | 5/2017 | Christopherson | E21B 34/02 |
| 2017/0370172 A1* | 12/2017 | Tran | F04B 23/04 |
| 2018/0320476 A1* | 11/2018 | McEvoy | E21B 34/02 |
| 2019/0010781 A1* | 1/2019 | Tran | E21B 34/025 |
| 2020/0277845 A1* | 9/2020 | Kajaria | E21B 43/26 |
| 2020/0399979 A1* | 12/2020 | Webster | E21B 34/025 |
| 2020/0400003 A1* | 12/2020 | Webster | E21B 33/068 |
| 2023/0235643 A1* | 7/2023 | Bushman | E21B 43/2607 |
| | | | 137/605 |

* cited by examiner

SYSTEM FOR FLUID TRANSFER

CROSS-REFERENCE TO RELATED APPLICATIONS

This application is a continuation application which claims priority from U.S. utility application Ser. No. 16/567,876, filed Sep. 11, 2019, which is itself non-provisional application that claims priority from U.S. Provisional Application 62/786,080, filed Dec. 28, 2018, both of which are incorporated herein by reference.

BACKGROUND OF THE INVENTION

Field of the Disclosure

This disclosure relates generally to the field of equipment used in fracturing operations.

Description of the Related Art

In oilfield production operations, some wells may be stimulated to increase the production of hydrocarbons, such as oil and gas. Such techniques may include high-pressure, or hydraulic, fracturing of the well formation, known to the art as "fracing" a well formation. Generally, in this process a fluid, is pumped into the formation surrounding the wellbore at high pressure via an assembly of valves, commonly referred to as a frac tree, and related frac fluid pumping equipment.

BRIEF SUMMARY

The following presents a simplified summary of the disclosed subject matter in order to provide a basic understanding of some aspects of the subject matter disclosed herein.

In an embodiment of the present disclosure, a fluid transfer system is described. The fluid transfer system includes a valve tree, the valve tree having a master valve having a flow axis, and a header. The fluid transfer system further includes a coupler disposed between, connected to, and in fluid communication with, the valve tree and the header. The coupler has a fixed length and includes a coupler multi-path flow connector in fluid communication with the valve tree. The coupler also includes a flow control valve having a flow axis, the flow control valve directly coupled to the coupler multi-path flow connector and in fluid communication with the header.

In another embodiment of the present disclosure, a method is described. The method includes providing a header and providing a coupler, the coupler having a fixed length. The coupler has a coupler multi-path flow connector and a flow control valve, the flow control valve directly coupled to the coupler multi-path flow connector. The method also includes connecting the coupler between the header and a valve tree, the valve tree in fluid communication with a wellhead. The valve tree has a master valve.

BRIEF DESCRIPTION OF THE DRAWING

The present disclosure is best understood from the following detailed description when read with the accompanying figures. It is emphasized that, in accordance with standard practice in the industry, various features are not drawn to scale. In fact, the dimensions of the various features may be arbitrarily reduced for clarity of discussion.

DETAILED DESCRIPTION

Figure 1:
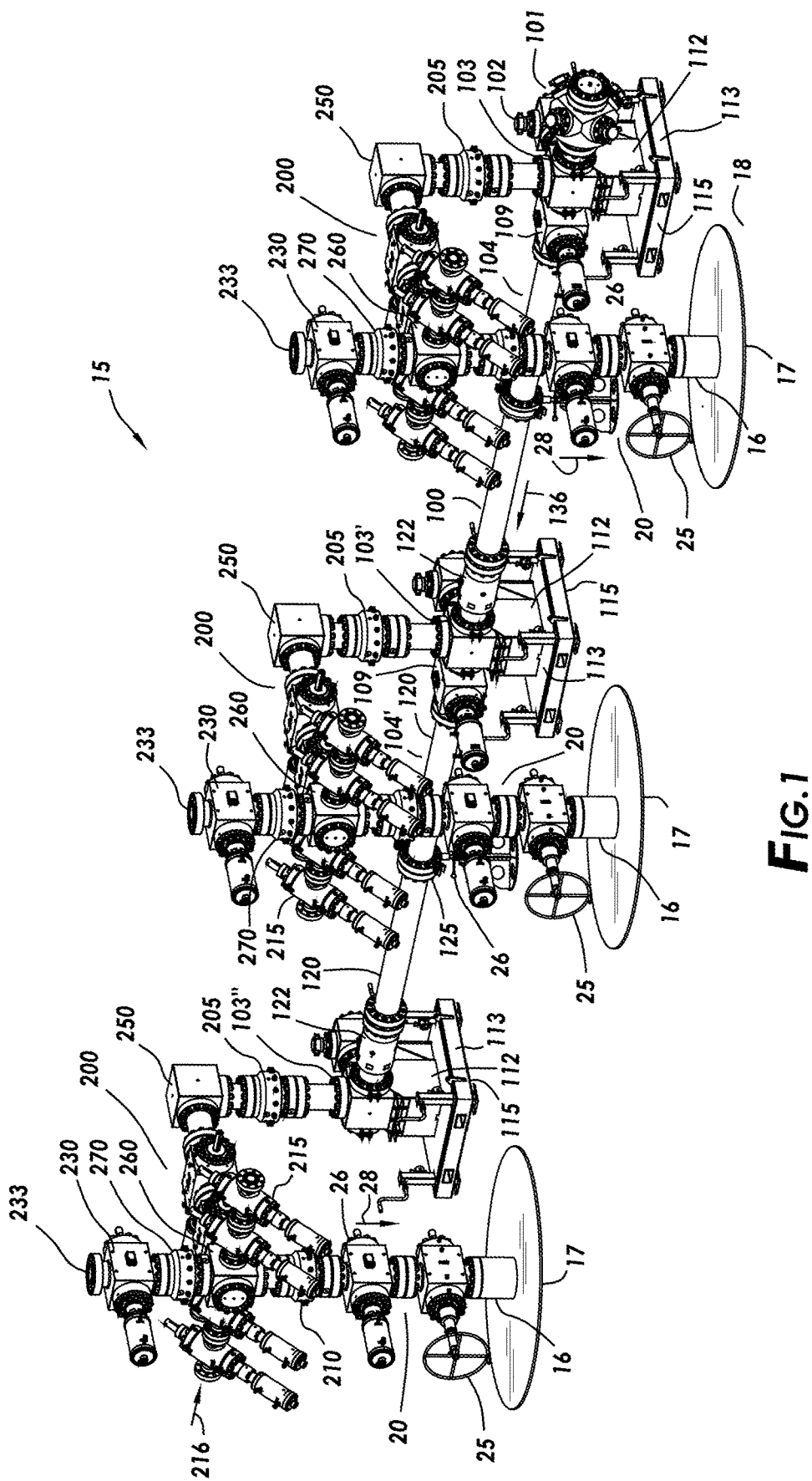
FIG. 1 is a perspective view of a fluid transfer system in accordance with an illustrative embodiment of the invention.

The following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

"Master valve"—A master valve is a valve located on a valve tree that controls all flow from a wellbore.

"Directly coupled" means connected without intermediate structure.

Figure 2:
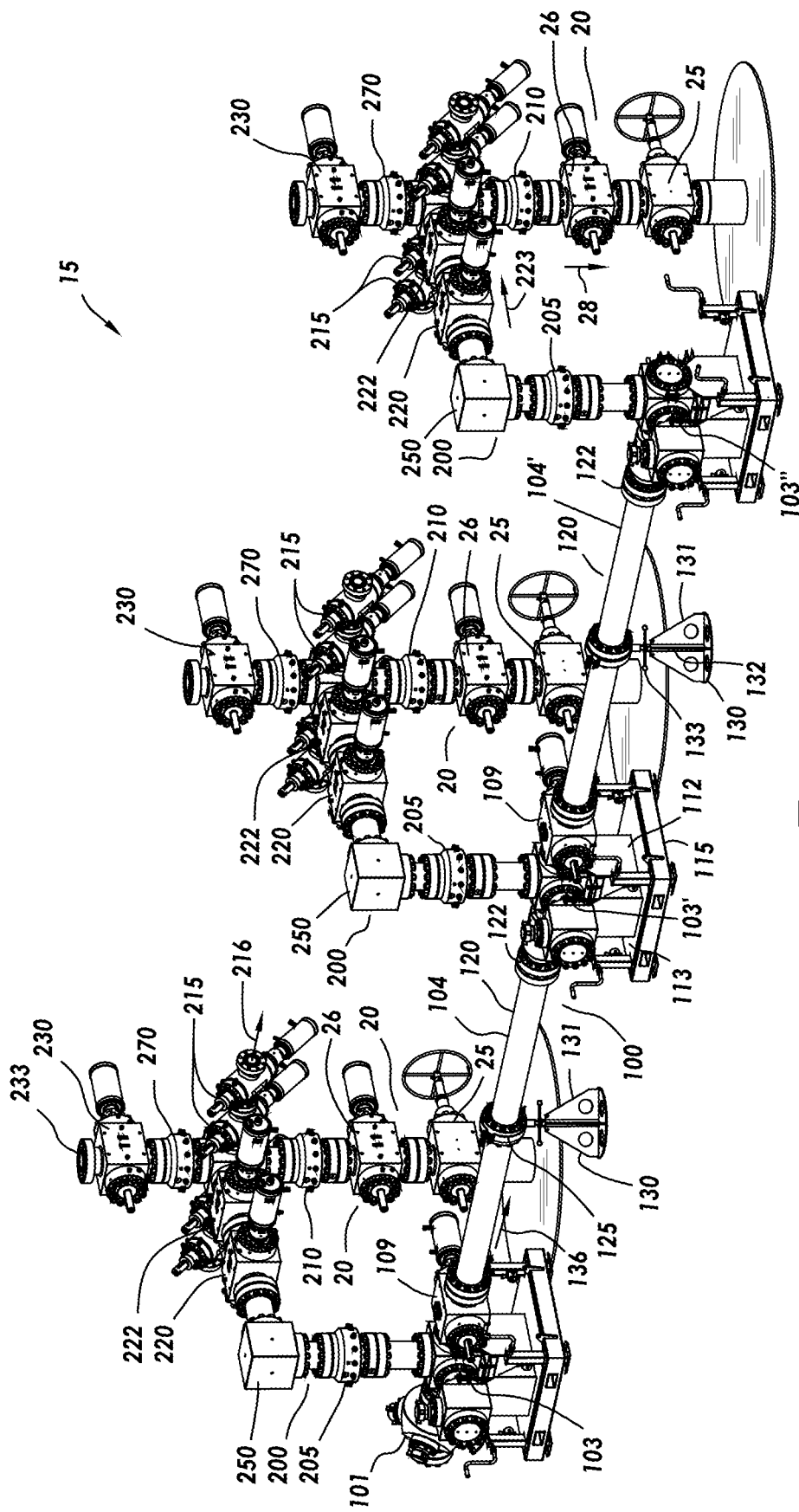
FIG. 2 is a front view of the fluid transfer system of FIG. 1.
Figure 3:
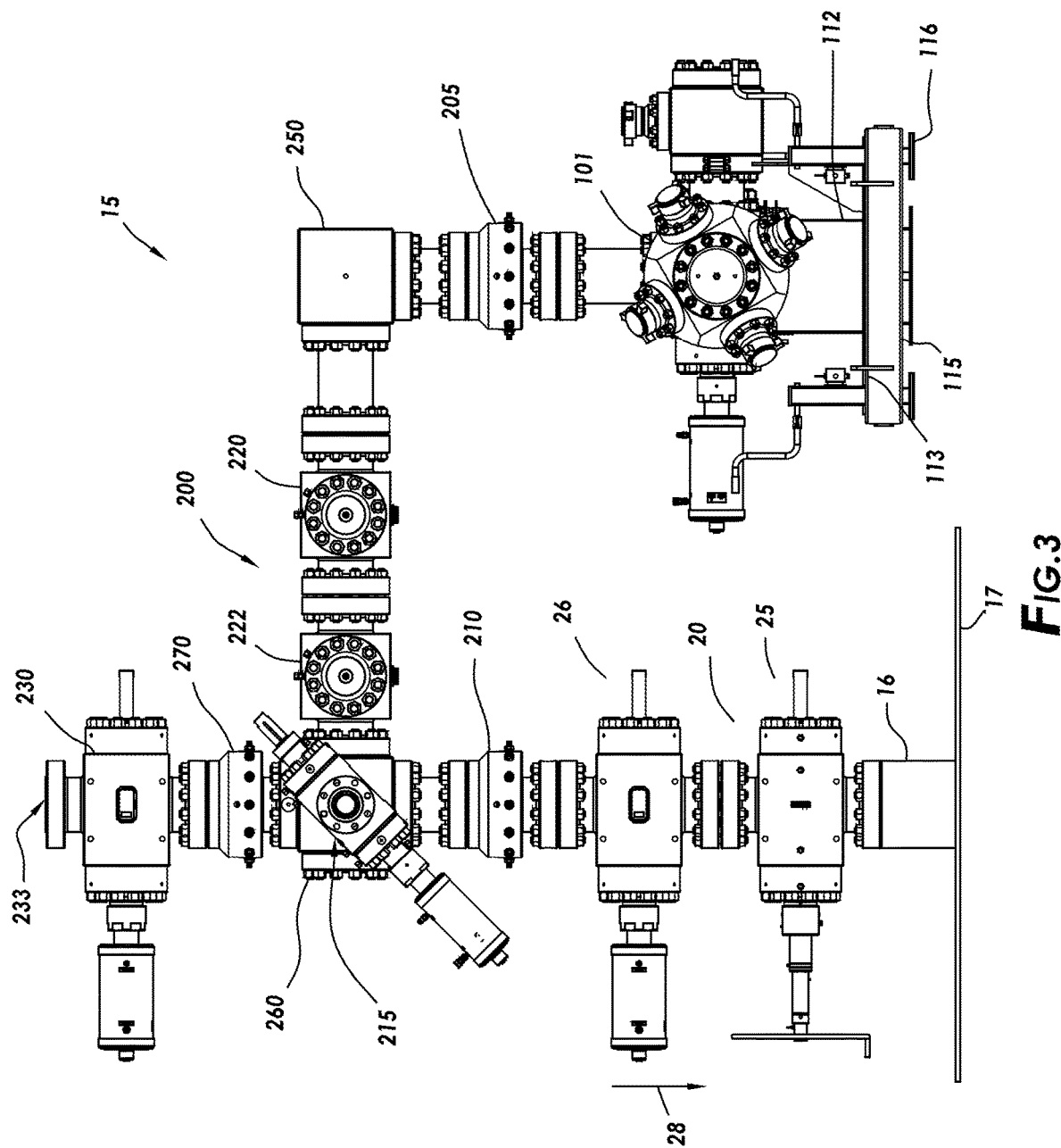
FIG. 3 is a side view of the fluid transfer system of FIG. 1.
Figure 4:
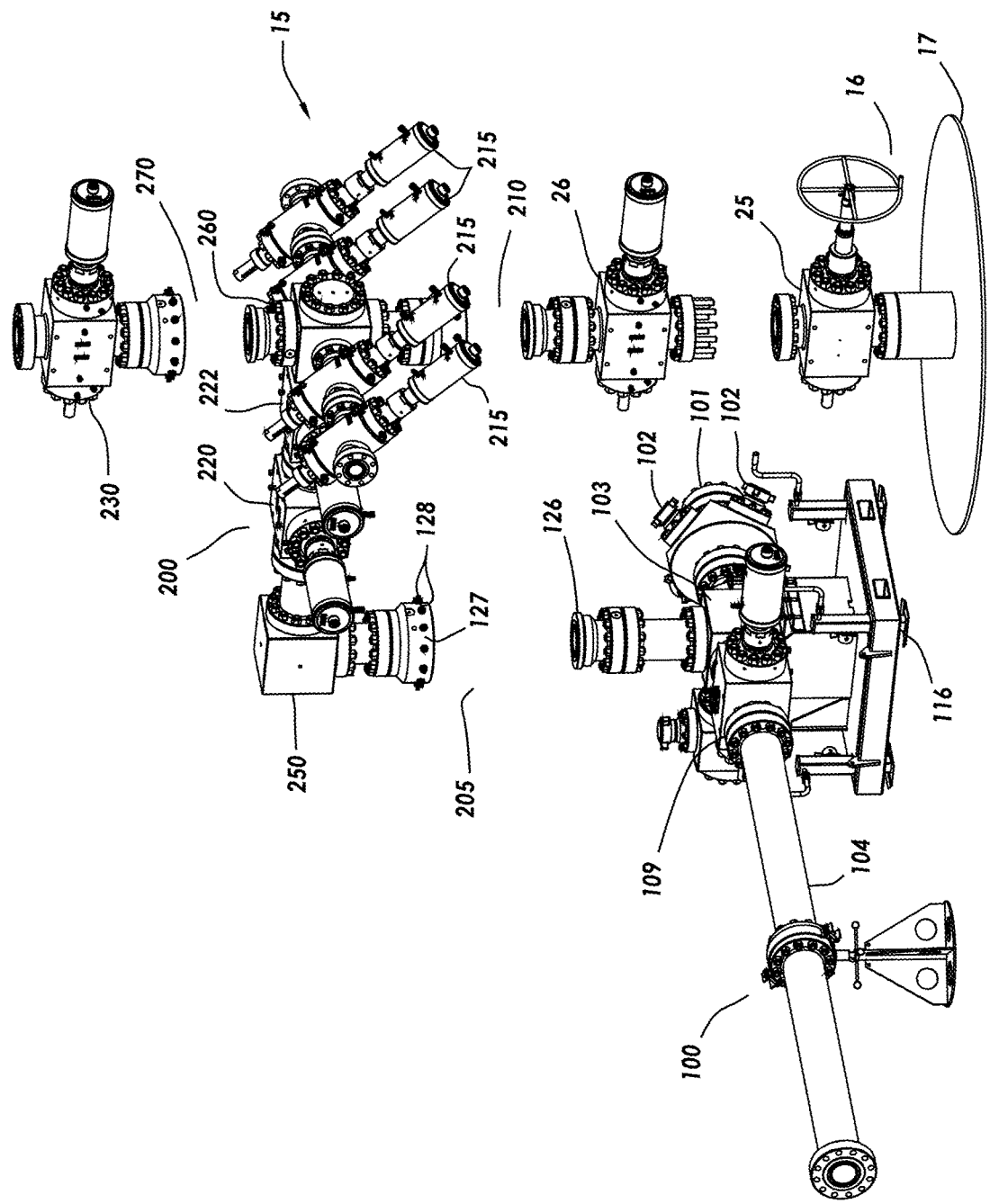
FIG. 4 is an exploded view of the portion of the fluid transfer system of FIG. 1.

FIGS. 1-4 depict one embodiment of fluid transfer system 15. Fluid transfer system 15 includes at least one valve tree 20. While FIGS. 1 and 2 depict three valve trees 20, any number of valve trees 20 may be included in fluid transfer system 15. Fluid transfer system 15 may further include header 100, such as when fluid transfer system 15 includes two or more valve trees 20. In certain embodiments, header 100 may supply fluid to valve tree 20, such as, for example and without limitation, pressurized frac fluid. Fluid transfer system 15 also includes coupler 200 for fluidly coupling header 100 to valve tree 20. In the embodiment shown in FIGS. 1 and 2, each valve tree 20 includes only one coupler 200 fluidly communicating with header 100, although multiple couplers 200 may be used to fluidly communicate between a single valve tree 20 and header 100.

As further depicted in FIGS. 1 and 2, each valve tree 20 is associated with a wellhead 16, wherein each wellhead 16 is connected to a hydrocarbon well. Circular pads 17 adjacent each wellhead 16 may be well cellar openings surrounding each wellhead 16 that provides access to the well and the portion of the wellhead 16 disposed below the earth's surface 18. Each valve tree 20 includes master valve 25. In certain embodiments, such as the embodiment depicted in FIGS. 1-4, each valve tree 20 may further include second master valve 26. Opening master valve 25 and/or second master valve 26 allows fluid flow through valve tree 20 along flow axis 28.

Header 100 may include inlet 101, such as a goat head or a flow cross, for entry of fluid, such as a pressurized frac fluid to header 100. Inlet 101 may include one or more fittings 102, to which hoses or piping may be connected.

Header 100 may also include header multi-path flow connector 103 to which inlet 101 connects.

Header multi-path flow connector 103 may be further connected to conduit 104. Conduit 104 may be connected to adjacent header multi-path flow connector 103' and conduit 104' to header multi-path flow connector 103". In the present illustrative embodiment of fluid transfer system 15, conduits 104 and 104' are shown. As is appreciated by those of ordinary skill in the art, any number of conduits 104 and header multi-path flow connectors 103 may be similarly connected. Although inlet 101 is shown at an end of header 100, if desired inlet 101 may be disposed at a location intermediate, or between, the ends of header 100. Header 100 may include isolation valve 109 positioned between header multi-path flow connector 103, 103', 103" and conduit 104, 104' or between sections of conduit 104 so as to isolate flow from adjacent header multi-path flow connectors 103.

Conduit 104 may be constructed of piping. Each conduit 104 may be formed of one or multiple spools 120. Spools 120 may be connected to isolation valves 109 and to header multi-path flow connector 103, 103', 103" by spool connections 125, which may be flanged connections, studded connections, threaded connections or quick connect connectors.

If desired, expansion spool 122, which can be adjustably extended in a longitudinal direction, may be positioned within conduit 104, 104', such as between two spools 120. By adjusting expansion spool 122, i.e., expanding or retracting expansion spool 122, coupler 200 may be horizontally aligned with a respective valve tree 20.

Header multi-path flow connectors 103, 103', 103" may be in certain non-limiting examples, studded or flanged flow tees. For example, header multi-path flow connectors 103, 103', 103" may be studded three-way or four-way flow tees, which permit flow through header multi-path flow connectors, 103, 103', 103" in a direction along longitudinal axis 136 (FIGS. 1 and 2) of header 100 and upwardly from header multi-path flow connectors 103, 103', 103" into coupler 200. If a four-way flow tee is used, flow may pass into a studded flow tee, or three-way block which may be used as auxiliary, or supplemental, inlets to, or outlets from, header 100.

In circumstances where only one valve tree 20 is present, header 100 may be omitted. As with embodiments where a plurality of valve trees 20 are present, the one valve tree embodiment includes multi-path flow connector 103 that provides a flow path from inlet 101 to coupler 200.

Header 100 may be supported by at least one elevating skid 115. Elevating skid 115 may allow vertical adjustment of header 100, thereby adjusting the vertical elevation of coupler 200. In certain non-limiting embodiments, elevating skid 115 may include adjustable base member 112, which rests upon support surface 113. Support surface 113 may be the earth's surface 18, adjacent circular pads 17, or metal skids that may include adjusting height adjusting leveling supports 116. While shown in FIGS. 1 and 2 as positioned beneath header multi-path flow connectors 103, 103', 103", elevating skids 115 may be positioned as desired along header 100.

As described above, each valve tree 20 may be connected to a respective coupler 200 for fluid communication with header 100 and inlet 101. In certain embodiments, coupler 200 has a fixed length, meaning that there are no expansion joints or other mechanisms designed to adjust the length or height of coupler 200. Coupler 200 may be joined by first coupler connector 205 to header 100 and joined by second coupler connector 210 to valve tree 20. First coupler connector 205 and second coupler connector 210 may be a conventional flanged connector or quick connect connectors. In addition to providing a quick and efficient connecting of each coupler to its respective frac tree, the header quick connect connectors may facilitate the efficient and safe installation and removal of coupler 200. Additionally, use of coupler 200 permits a user of fluid transfer system 15 to quickly disassemble, or "rig down", the fluid transfer system 15 to access master valves 25, 26 for replacement of one or more master valves 25, 26.

Figure 5:
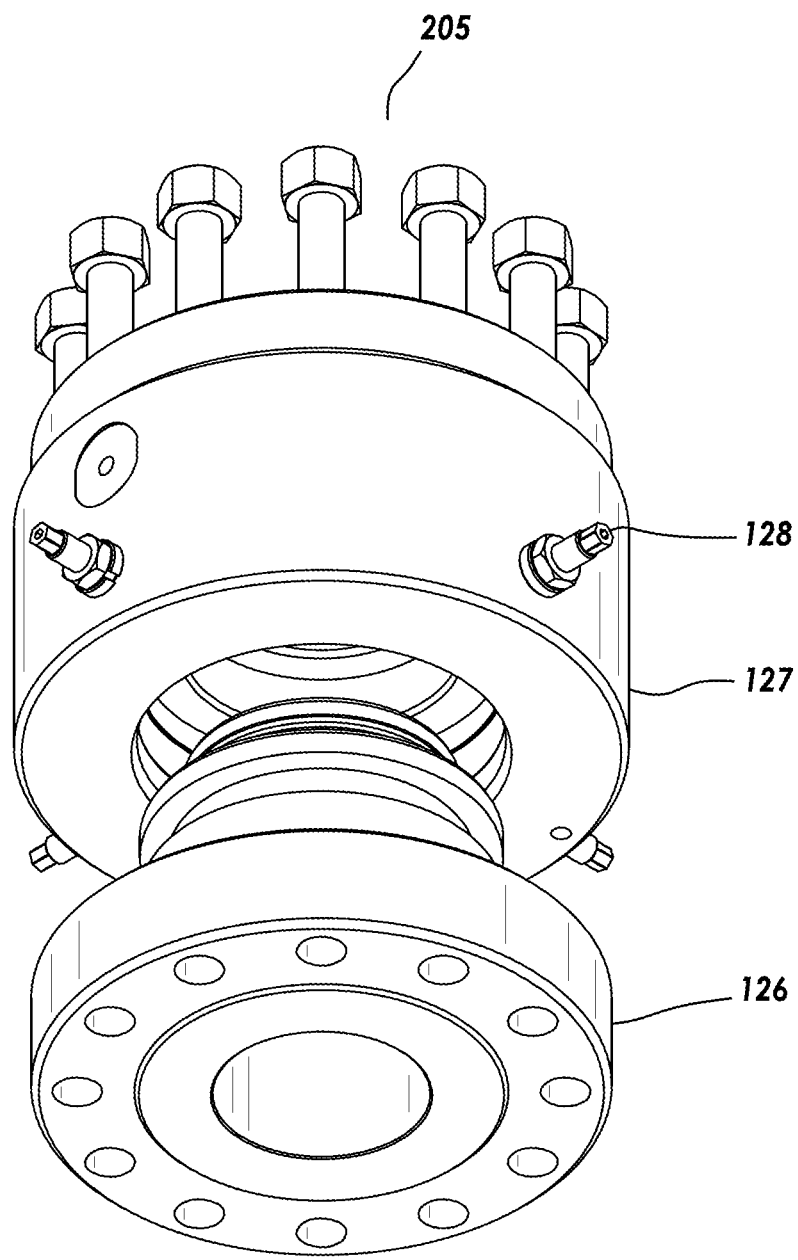
FIG. 5 is an exploded view of a quick connect connector in accordance with at least one embodiment of the present disclosure.
Figure 6:
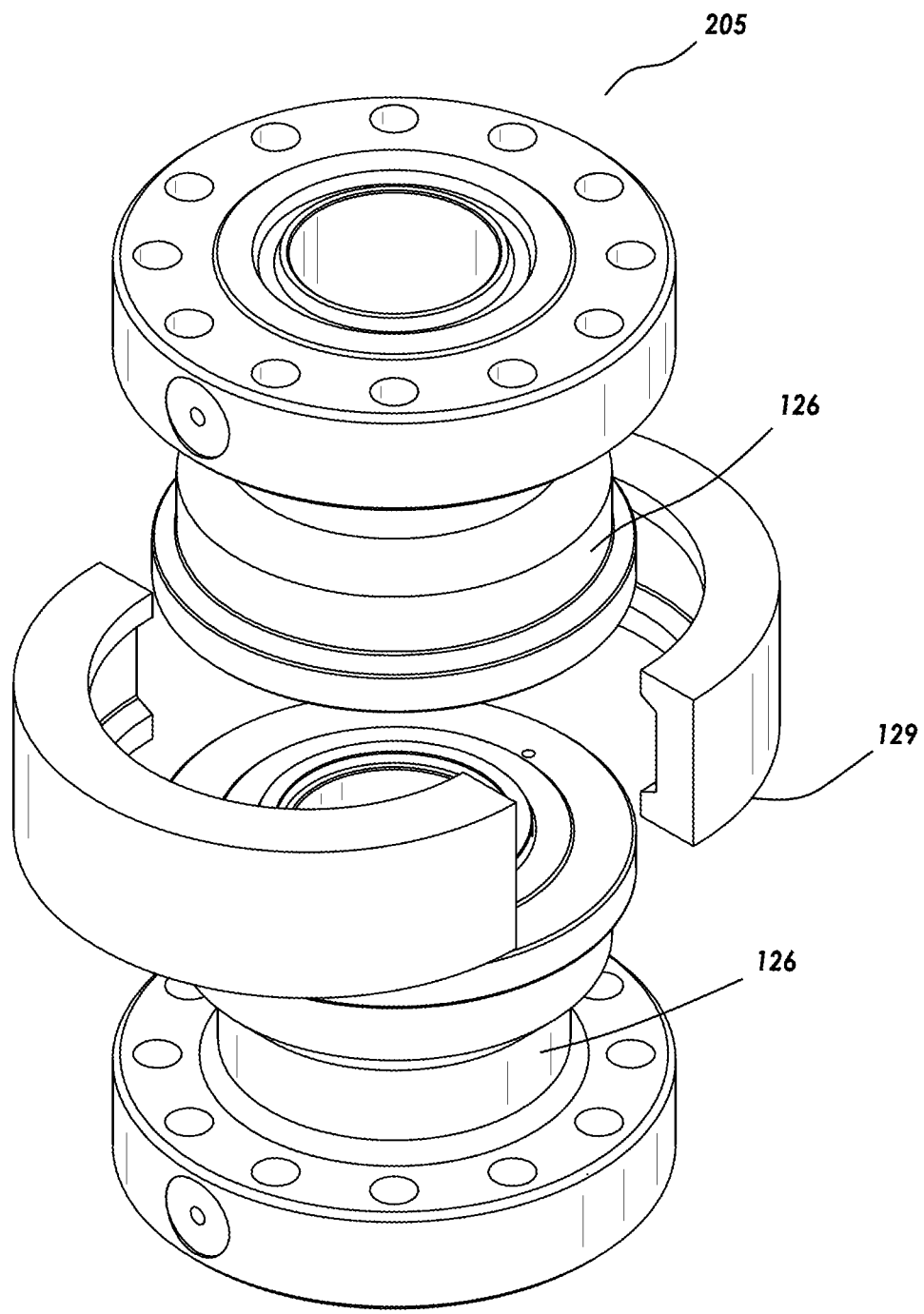
FIG. 6 is an exploded view of a quick connect connector in accordance with at least one embodiment of the present disclosure.
Figure 7:
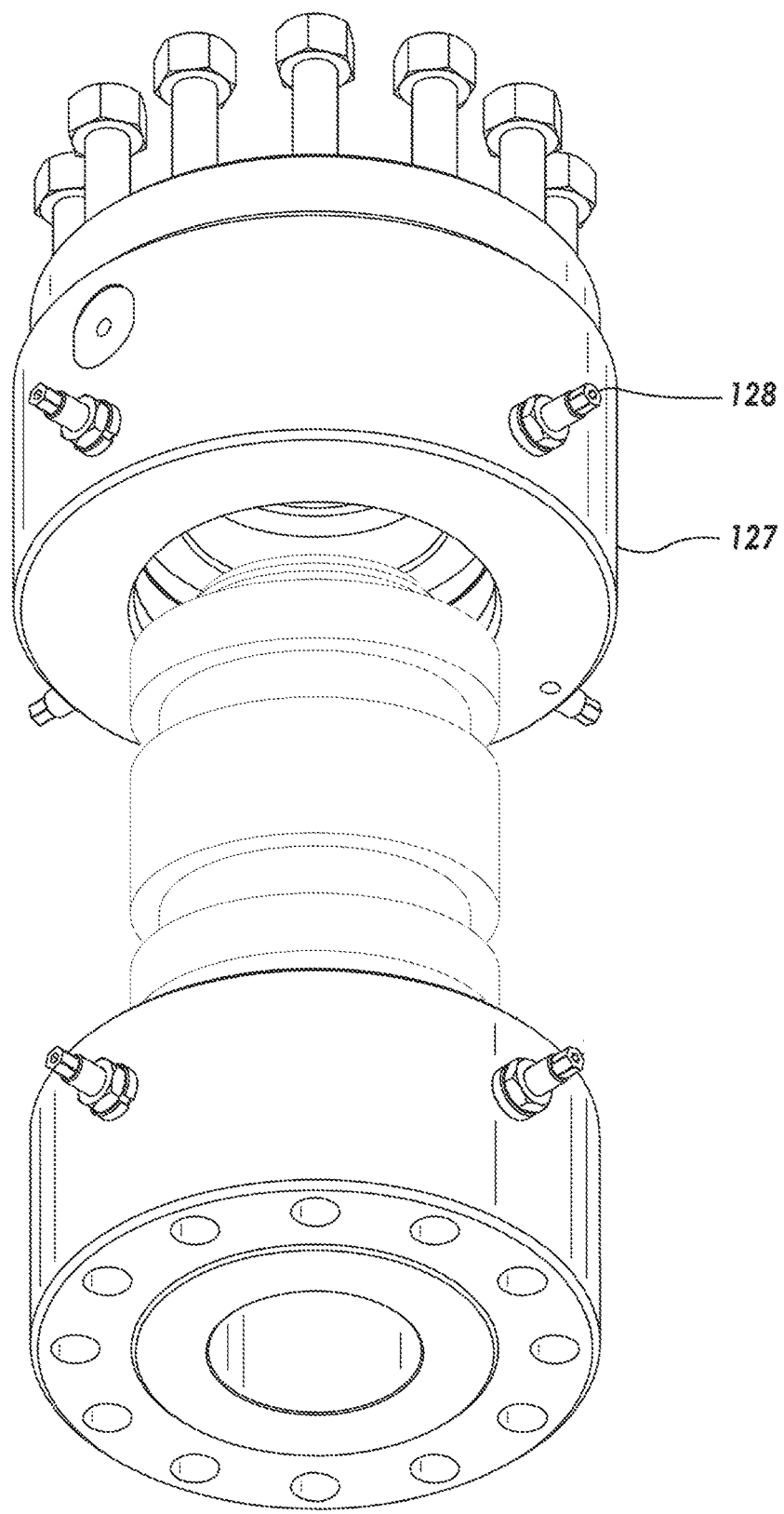
FIG. 7 is an exploded view of a quick connect connector in accordance with at least one embodiment of the present disclosure.

When connectors, such as first coupler connector 205 or second coupler connector 210 are quick connectors, the connectors may include male tubular member 126, which is matingly received within female tubular member 127. As shown in FIG. 5, first coupler connector 205, for example, may include male tubular member 126 received within the female tubular member 127. A plurality of drive screws 128 may be tightened to releasably secure male and female tubular members 126, 127, in a sealed relationship. Thus, male and female tubular members 126, 127 may form first coupler connector 205, for example, without assembly and tightening of conventional nut and bolt connections. In certain other embodiments, as shown in FIG. 6, the quick connect connector may include two male tubular members 126 matingly and releasably received within a pipe section or clamp 129. In yet other embodiments, the quick connect connector includes two female tubular members 127 matingly and releasably receiving a pipe section or clamp. In some embodiments, the quick connect connectors may reverse the male and female tubular members 126, 127 of quick connect connectors.

In certain embodiments, coupler 200 may include at least two wing valves 215. In some embodiments, four wing valves 215 may be used, for instance, where two of wing valves 215 are disposed approximately 180 degrees apart from the other two wing valves 215 and may form a row, the row having a longitudinal axis 216 (FIGS. 1 and 2).

In certain embodiments, coupler 200 includes at least one flow control valve 220, and may include two flow control valves 220, 222 disposed at an angle of approximately 90 degrees from longitudinal axis 216. Flow control valves 220, 222 may be used to control the flow of fluid from header 100 to each valve tree 20. Flow control valves 220, 222 may have internal bore dimensions that are greater than, or equal to, the internal bore dimension of, master valves 25, 26. Flow control valves 220, 222 may have flow axis 223 that is perpendicular to longitudinal axis 216. In some embodiments, flow control valves 220, 222 may be directly coupled to coupler multi-path flow connectors 260. In certain embodiments, such as if fluid transfer system 15 is used with a single frac tree, coupler 200 may not include flow control valve 220.

Coupler 200 may include or be in fluid communication with swab valve 230. In certain embodiments, swab valve 230 is integral with coupler 200. In other embodiments, swab valve 230 is connected to coupler 200 by a flanged connection, studded connection, threaded connection, clamp, or quick connect connector.

Coupler 200 may include elbow 250, such as a two-way block, disposed between flow control valves 220, 222 and first coupler connector 205. Coupler multi-path flow connector 260, such as a coupler multi-path flow connector with three fluid connection ports, a studded 5-way flow cross or a 6-way flow cross with a blind flange may be positioned below swab valve 230. Coupler multi-path flow connector 260 may be in fluid communication with: swab valve 230;

wing valves 215; flow control valves 220, 222; and valve tree 20. In certain embodiments, flow control valves 220, 222 are directly connected to coupler multi-path flow connector 260, without any intervening piping or components.

During the drilling of a well, wellhead 16 may be installed on each well. Valve tree 20 may be connected to wellhead 16. Master valves 25, 26 are installed, or attached, to wellhead 16. When more than one valve tree 20 is used, header 100 is then positioned in a spaced relationship from wellhead 16.

Coupler 200 may be assembled at the well site; in other embodiments, the components of the coupler 200 are pre-assembled at another location. Coupler 200 may be transported to the well site and be lifted, such as by a crane or other suitable lifting device and positioned above header 100 and valve tree 20. Coupler 200 may be lowered and connected to header 100 and valve tree 20, using first coupler connector 205 and second coupler connector 210. When first coupler connector 205 and second coupler connector 210 are flanged or studded connectors, first coupler connector 205 and second coupler connector 210 may be affixed by bolting. If quick connect connectors are used for first coupler connector 205 and second coupler connector 210 female tubular members 127 of first coupler connector 205 and second coupler connector 210 are positioned about male tubular members 126 of the quick connect connectors. Thereafter, drive screws 128 may be tightened to securely fasten female tubular members 127 to male tubular members 126 of the quick connect connectors.

If fluid transfer system 15 includes a plurality of valve trees 20, additional portions of header 100 may be assembled to include conduit 104', isolation valve 109, header multi-path flow connectors 103', and elevating skids 115, as shown in FIGS. 1 and 2. These additional portions of header 100 are assembled in the manner previously described and are mounted on elevating skids 115 and are each disposed in a spaced relationship from wellheads of each additional valve tree 20. As previously described, these other portions of the header 100 are then connected together as by conduit 104', as previously described, so that header 100 appears as shown in FIGS. 1 and 2. Each additional coupler 200 may be connected to header 100 as shown in FIGS. 1 and 2 and valve trees 20. Fluid transfer system 15 may be enlarged for use with additional valve trees, as by attaching additional portions of the header 100 and couplers.

Header 100 may include vertical supports 130 disposed under spools 120, such as below spool connections 125 between spools 120. In certain non-limiting embodiments, vertical supports 130 may be formed from a plurality of triangular shaped panel members 131 and drive screw assembly 132, which upon rotation of handle 133, results in upward or downward movement of spool connections 125 of header 100. If desired, additional vertical supports 130 may be used to support spools 120.

Coupler 200 may include third coupler connector 270 disposed above coupler multi-path flow connector 260 and below swab valve 230. Third coupler connector 270 may be a conventional flanged connection. Third coupler connector 270 may be a quick connect connector.

While several exemplary embodiments have been provided in the present disclosure, it may be understood that the disclosed embodiments might be embodied in many other specific forms without departing from the spirit or scope of the present disclosure and the appended claims. The present examples are to be considered as illustrative and not restrictive, and the intention is not to be limited to the details given herein. For example, the various elements or components may be combined or integrated in another system or certain features may be omitted, or not implemented.

In addition, the various exemplary embodiments described and illustrated in the various embodiments as discrete or separate may be combined or integrated with other systems, modules, techniques, or methods without departing from the scope of the present disclosure. Other examples of changes, substitutions, and alterations are ascertainable by one skilled in the art and may be made without departing from the spirit and scope disclosed herein.

We claim:

1. A fluid transfer system, comprising:
   a header, wherein the header comprises:
   an inlet;
   a first multi-path flow connector configured to be fluidly connected to the inlet;
   a second multi-path flow connector configured to be connected downstream relative to the first multi-path flow connector; and
   an isolation valve fluidly connected between the first multi-path flow connector and the second multi-path flow connector;
   a first valve tree configured to be secured to a first wellhead such that the first valve tree is fluidly connected to the first wellhead, wherein the first valve tree comprises a first one or more master valves;
   a first coupler configured to fluidly connect the first multi-path flow connector in the header to the first valve tree, wherein the first coupler comprises a first one or more flow control valves;
   a second valve tree configured to be secured to a second wellhead such that the second valve tree is fluidly connected to the second wellhead, wherein the second valve tree comprises a second one or more master valves; and
   a second coupler configured to fluidly connect the second multi-path flow connector in the header to the second valve tree, wherein the second coupler comprises a second one or more flow control valves.

2. The fluid transfer system of claim 1, wherein:
   the first one or more flow control valves in the first coupler have a first bore diameter that is greater than another first bore diameter of the first one or more master valves in the first valve tree; and
   the second one or more flow control valves in the second coupler have a second bore diameter that is greater than another second bore diameter of the second one or more master valves in the second valve tree.

3. The fluid transfer system of claim 1, wherein:
   the first multi-path flow connector in the header comprises a first flow tee; and
   the second multi-path flow connector in the header comprises a second flow tee.

4. The fluid transfer system of claim 1, wherein:
   the first multi-path flow connector in the header is configured to route pressurized fluid up to the first coupler; and
   the first coupler is configured to route pressurized fluid down to the first valve tree.

5. The fluid transfer system of claim 1, comprising a third coupler, wherein:
   the header comprises:
   a third multi-path flow connector connected downstream relative to the second multi-path flow connector; and another isolation valve fluidly connected between the second multi-path flow connector and the third multi-path flow connector; and the third coupler is configured to fluidly connect the third multi-path flow connector in the header to the first valve tree or the second valve tree.

6. The fluid transfer system of claim 1, comprising:
a third valve tree configured to be secured to a third wellhead such that the third valve tree is fluidly connected to the third wellhead, wherein:
the third valve tree comprises a third one or more master valves; and
the header comprises:
a third multi-path flow connector connected downstream relative to the second multi-path flow connector; and
another isolation valve fluidly connected between the second multi-path flow connector and the third multi-path flow connector; and
a third coupler configured to fluidly connect the third multi-path flow connector in the header to the third valve tree.

7. The fluid transfer system of claim 1, wherein the header comprises an adjustable spool fluidly connected between the first multi-path flow connector and the second multi-path flow connector, wherein the adjustable spool is configured to extend or retract to facilitate:
aligning the first multi-path flow connector in the header with the first coupler and the first valve tree; and
aligning the second multi-path flow connector in the header with the second coupler and the second valve tree.

8. The fluid transfer system of claim 1, wherein the isolation valve in the header is configured to be:
open when frac fluid is to be supplied from the header to the second valve tree, another downstream valve tree, or both; and
closed when the frac fluid is to be supplied from the header to the first valve tree, but not any downstream valve trees to block the frac fluid from entering the second coupler that fluidly connects the second multi-path flow connector in the header to the second valve tree.

9. A method of operating a fluid transfer system, comprising:
supplying frac fluid to an inlet of a header, wherein:
the inlet of the header is fluidly connected to a first multi-path flow connector; and
the first multi-path flow connector is fluidly connected to a first valve tree via a first coupler, wherein,
the first valve tree comprises a first one or more master valves; and
the first coupler comprises a first one or more flow control valves;
opening an isolation valve that is fluidly connected between the first multi-path flow connector and a second multi-path flow connector in response to determining that the frac fluid is to be supplied to a second valve tree, wherein the second multi-path flow connector is fluidly connected to the second valve tree via a second coupler, wherein:
the second valve tree comprises a second one or more master valves; and
the second coupler comprises a second one or more flow control valves; and
closing the isolation valve fluidly connected between the first multi-path flow connector and the second multi-path flow connector in response to determining that the frac fluid is to be supplied to the first valve tree, but not the second valve tree to block the frac fluid from entering the second coupler.

10. The method of claim 9, wherein:
the first multi-path flow connector comprises a first flow tee; and
the second multi-path flow connector comprises a second flow tee.

11. The method of claim 9, wherein opening the isolation valve comprises:
routing the frac fluid from the second multi-path flow connector up to the second coupler; and
routing the frac fluid from the second coupler down to the second valve tree.

12. A method of implementing a fluid transfer system, comprising:
fluidly connecting an inlet of a header to a first multi-path flow connector;
fluidly connecting a first coupler between the first multi-path flow connector and a first valve tree, wherein;
the first valve tree comprises a first one or more master valves; and
the first coupler comprises a first one or more flow control valves;
fluidly connecting a second coupler between a second multi-path flow connector and a second valve tree, wherein,
the second valve tree comprises a second one or more master valves; and
the second coupler comprises a second one or more flow control valves; and
fluidly connecting an isolation valve between the first multi-path flow connector and the second multi-path flow connector to facilitate controlling flow of fluid from the inlet of the header into the second coupler that is fluidly connected between the second multi-path flow connector and the second valve tree.

13. The method of claim 12, wherein:
the first multi-path flow connector comprises a first flow tee; and
the second multi-path flow connector comprises a second flow tee.

14. The method of claim 12, wherein fluidly connecting the first coupler between the first multi-path flow connector and the first valve tree comprises:
securing the first coupler above the first multi-path flow connector; and
securing the first coupler above the first valve tree.

15. The method of claim 12, comprising fluidly connecting an adjustable spool between the first multi-path flow connector and the second multi-path flow connector at least in part by adjusting length of the adjustable spool to facilitate:
aligning the first multi-path flow connector with the first coupler and the first valve tree; and
aligning the second multi-path flow connector with the second coupler and the second valve tree.

16. The method of claim 12, comprising:
fluidly connecting a third coupler between a third multi-path flow connector and the first valve tree or the second valve tree; and
fluidly connecting another isolation valve between the inlet of the header and the third multi-path flow connector to facilitate controlling flow of fluid from the inlet of the header into the third coupler that is fluidly connected between the third multi-path flow connector and the first valve tree or the second valve tree.

17. The method of claim 12, comprising:

fluidly connecting a third coupler between a third multi-path flow connector and a third valve tree; and fluidly connecting another isolation valve between the second multi-path flow connector and the third multi-path flow connector to facilitate controlling flow of fluid from the inlet of the header into the third coupler that is fluidly connected between the third multi-path flow connector and the third valve tree.

* * * * *